United States Patent [19]

Martin et al.

[11] 4,115,069
[45] Sep. 19, 1978

[54] SEQUENTIAL IGNITION SYSTEM FOR OXYGEN GENERATION ELEMENTS

[75] Inventors: Frank Eugene Martin, Chester; Edward Larmour Rich, III, Arnold, both of Md.

[73] Assignee: Midori Anzen Company, Ltd., Tokyo, Japan

[21] Appl. No.: 805,580

[22] Filed: Jun. 10, 1977

[30] Foreign Application Priority Data

Jun. 18, 1976 [JP] Japan .................................. 51-71013

[51] Int. Cl.² .............................................. B01J 7/00
[52] U.S. Cl. .................................. 422/112; 423/281; 102/39; 422/166
[58] Field of Search ......................... 23/281; 423/579; 431/60, 43, 78; 137/604, 606; 102/39

[56] References Cited

U.S. PATENT DOCUMENTS

| | | | |
|---|---|---|---|
| 3,436,191 | 4/1969 | McGoff et al. | 23/281 |
| 3,561,900 | 2/1971 | Walbridge | 431/74 |
| 3,573,001 | 3/1971 | Bovard | 23/281 |

*Primary Examiner*—James H. Tayman, Jr.
*Attorney, Agent, or Firm*—Wenderoth, Lind & Ponack

[57] ABSTRACT

Three chlorate candles are connected to a common conduit to which a normally open pressure switch is connected on the downstream side. The switch closes in response to a flow rate less than its predetermined minimum magnitude of oxygen from each candle flowing through the conduit. The pressure switch and one thermal switch for each candle except the last one are serially interconnected across a DC source through a resistor. When that candle first ignited is weakened in generation of oxygen, the next candle is ignited with the closure of the two serially connected switches and through the resulting heating of the associated resistor. The third candle is similarly ignited.

4 Claims, 3 Drawing Figures

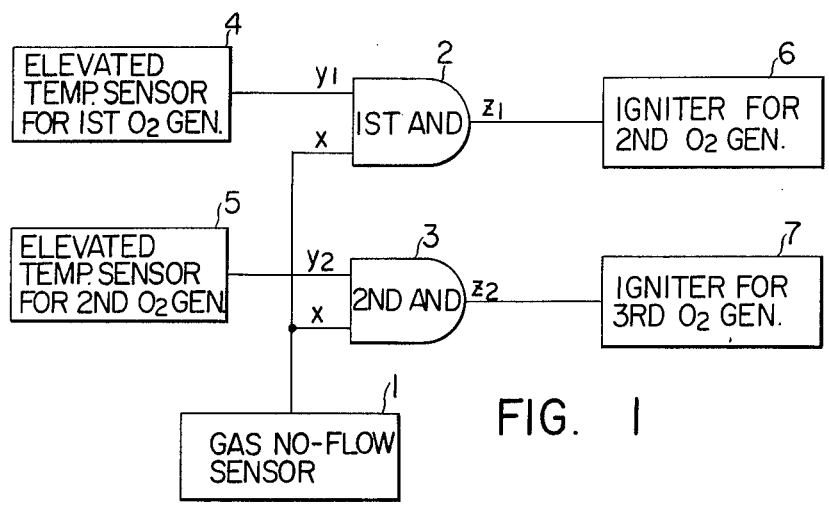
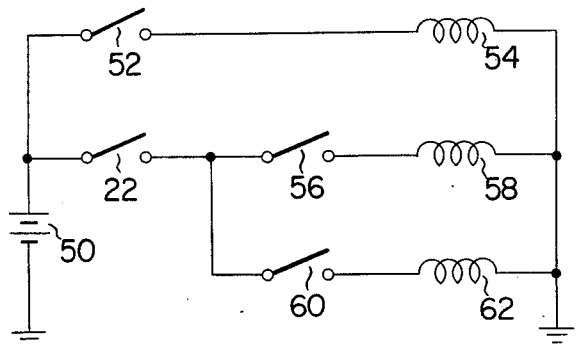
FIG. 3
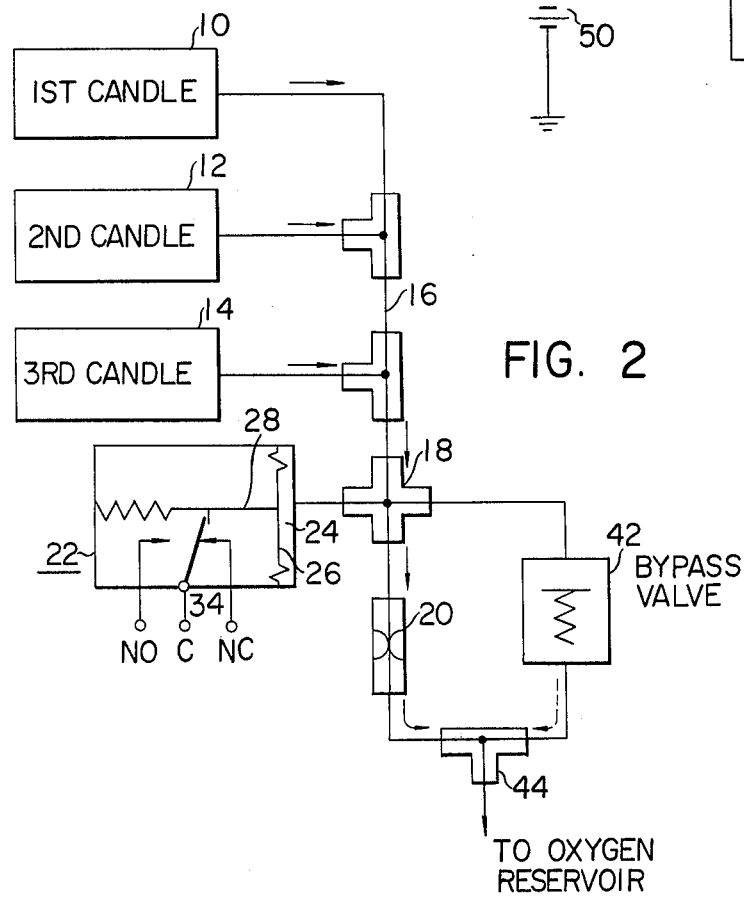
FIG. 2

SEQUENTIAL IGNITION SYSTEM FOR OXYGEN GENERATION ELEMENTS

BACKGROUND OF THE INVENTION

This invention relates to a sequential ignition system for an oxygen generation device including a plurality of oxygen generation elements, and more particularly to such a system for automatically burning a plurality of oxygen generation elements one by one or a predetermined number greater than one at a time so as not to interrupt the generation of oxygen, and without burning all the oxygen generation elements at a time.

For a long time, there have been known portable, safe oxygen sources formed of the chemical oxygen generation element including principally alkali metal chlorate, for example, sodium chlorate added with an exothermic agent such as a powder of reduced iron and a chlorine absorbent such as barium perioxide and shaped into a candle. Such a chemical oxygen generation element is called a "chlorate candle" and there have been previously proposed a variety of oxygen generation devices employing the chlorate candle. The chemical oxygen generation element has many advantages, on the one hand, but some disadvantages, on the other hand. For example, the chlorate candle decomposition rate is difficult to control and therefore rate of oxygen generation can become erratic. One result has been that large-sized oxygen generation elements have been especially difficult to maintain at a rate at which oxygen is stably generated. Accordingly, if it is demanded to generate oxygen in the stabilized manner for a long time interval then it has been generally adopted to prepare a plurality of oxygen generation elements and sequentially burn them one after another or a predetermined number greater than one at a time. Under these circumstances, when any oxygen generation element being burnt has completed or nearly completed generating oxygen, the next succeeding one must be immediately ignited thereby to prevent the generation of oxygen from interrupting. To this end, a variety of sequential ignition systems for the group of oxygen generation elements are devised. Since oxygen generation devices of the type referred to are frequently employed in case of emergency, they are desirable to be as simple in both construction and manipulation as possible and still reliably operated.

Accordingly it is an object of the present invention to provide a new and improved system for sequentially igniting a plurality of oxygen generation elements with a simple, reliable construction.

SUMMARY OF THE INVENTION

The present invention provides a sequential ignition system for an oxygen generation device comprising a plurality of chemical oxygen generation elements, each burning to generate oxygen, a common feed conduit connected to all the chemical oxygen generation elements to cause oxygen from each of the oxygen generation elements to flow therethrough, gas flow sensor means connected to the feed conduit downstream of the most downstream oxygen generation element to provide a first control signal in response to a flow rate less than a predetermined minimum magnitude of the oxygen flowing through the feed conduit, manually operated igniter means for igniting a first one of the chemical oxygen generation elements, a plurality of igniter means for the chemical oxygen generation elements except for the first one, a plurality of temperature sensor means operatively coupled to the chemical oxygen generation elements respectively except for the chemical oxygen generation element to be last ignited, each of the temperature sensor means being responsive to the burnt, heated state of the associated oxygen generator element to provide a second control means, and an AND gate including one input connected to the gas flow sensor means, the other end connected to the temperature sensor means for each of the chemical oxygen generation elements, and an output connected to the igniter means for the next succeeding oxygen generation element, each of the AND gates responding to both the first and second control signals applied thereto to provide an output to actuate the associated igniter means to ignite the oxygen generation element operatively coupled to the latter.

BRIEF DESCRIPTION OF THE DRAWINGS

The present invention will become readily apparent from the following detailed description taken in conjunction with the accompanying drawings in which:

FIG. 1 is a block diagram illustrating a logic circuit of a sequential ignition system for a plurality of chemical oxygen generation elements constructed in accordance with the principles of the present invention;

FIG. 2 is a schematic view of the gas flow sensor shown in FIG. 1 with associated components connected in fluid communication with the gas flow sensor; and FIG. 3 is a schematic electric circuit of the sequential ignition system shown in FIG. 1.

DESCRIPTION OF THE PREFERRED EMBODIMENT

While the present invention is applicable to any desired number of chemical oxygen generation elements the same will now be described in conjunction with three oxygen generation elements only for purposes of illustration.

In a preferred embodiment of the present invention shown in FIG. 1, a gas flow sensor 1 is connected to one input of a first and a second AND gate 2 and 3 respectively, with the other inputs connected to temperature sensors 4 and 5 for a first and a second chemical oxygen generation elements respectively. The first AND gate 2 includes an output connected to an igniter 6 for the second chemical oxygen generation element while the second gate 3 includes an output connected to an igniter 7 for a third chemical generation element. It will readily be understood that a manually operated igniter is operatively coupled to the first chemical oxygen generation element to first ignite it although that igniter is not shown only for purposes of illustration.

In the example illustrated each of the chemical oxygen generation elements includes principly sodium chlorate mixed with a powder of reduced iron as an exothermic agent and barium peroxide as a chlorine absorbent and shaped into a candle as by filling a canister with the resulting mixture. Such a chemical oxygen generation element is generally called a "candle".

As shown in FIG. 2, a first, a second and a third candle 10, 12 and 14 respectively are connected in fluid communication with a common feed conduit 16. The feed conduit 16 is connected via a manifold 18 to an orifice 20. The the manifold 18 is connected at one outlet to a pressure switch generally designated by the reference numeral 22. Thus the pressure switch 22 forms the gas flow sensor 1 as shown in FIG. 1 with the orifice 20 connected to the feed conduit 16 downstream of the last candle in this case, the third candle 14.

The present switch 22 includes a pressure chamber 24 communicating with the manifold 18 and therefore the feed conduit 16 and separated away from the remaining space thereof by a disphragm 26. The diaphragm 26 includes a spring loaded rod 28 centrally extending from that surface facing the remaining space into the latter. The rod 28 is operatively coupled to a movable arm of a microswitch 34 including a pair of stationary contacts connected to respective terminals NO and NC. The movable arm of the microswitch 34 is connected to a terminal C subsequently connected to an electric source (not shown).

The manifold 18 is also connected at a separate outlet to a bypass valve 42 for the purpose as will be apparent later. Then the bypass valve 42 is connected to the orifice 20 through another manifold 44 which is, in turn, connected, for example, to an oxygen reservoir (not shown). Thus the bypass valve 42 is connected across the orifice 20.

In the arrangement of FIG. 2, the first candle 10 is first ignited by a manually operated igniter therefore to emit or generate oxygen to deliver it to the feed conduit 16. The second and third candles 12 and 14 must be successively ignited when the preceding one is generating oxygen at a predetermined minimum magnitude of a flow rate of oxygen flowing through the feed conduit 16.

The flow rate of the gaseous oxygen has its permissible minimum magnitude as determined for the particular purpose as well as depending upon the presence or absence of an oxygen reservoir and the dimension of the reservoir if present. In the embodiment illustrated the permissible minimum magnitude of the flow rate has been predetermined to be of 0.35 liter per minute with a normal flow rate of 2.5 ± 0.5 liters per minute, both figures being converted in the standard state, that is, at one atmosphere pressure at 25° C.

In order to properly operate the pressure switch 22 with the aid of the orifice 20, the pressure switch 22 and the orifice 20 have respectively an operating constant and a dimension meeting the following requiremens:

(i) When the oxygen flowing through the feed conduit 16 has a flow rate equal to or higher than the predetermined minimum magnitude just specified, the pressure switch 22 is maintained in its open position by means of a back pressure caused by the orifice 20; and (ii) When the flow rate of the oxygen becomes less than the predetermined minimum magnitude because of burn-out of the particular candle, the pressure switch 22 is put and maintained in its closed position owing to a corresponding decrease in back pressure on the orifice 20.

The microswitch 34 is shown in FIG. 2 as being in its closed position.

Thus when a flow rate of the oxygen flowing through the feed conduit 16 is not less than the predetermined minimum magnitude, the diaphragm 24 along with the spring loaded rod 28 is moved in the lefthand direction as viewed in FIG. 2 to force the movable arm of the microswitch 34 in engagement with that stationary contact connected to the terminal NO resulting in the opening of the mcroswitch 34. On the contrary, if the flow rate drops below the predetermined minimum magnitude then the diaphragm 24 forces the movable switch 34 arm in engagement with that stationary contact connected to the terminal NC. Therefore the microswitch 34 is closed to develope a control signal at the terminal NC.

In other words, the pressure switch 22 senses flow rate less than the predetermined minimum magnitude under low pressures of the oxygen within the conduit 16. However it is to be noted that the pressure switch 22 can accommodate much higher flow rates acceptable by the system.

The generation of oxygen may become intermittently excessive as compared with the standard state thereof resulting in a danger that components within the system may be excessively pressurized. The bypass valve 42 is immediately responsive to an increase in pressure within the conduit 16 beyond a magnitude sufficient to maintain the pressure switch 22 in its open position to be automatically opened against the action of an associated spring. The opening of the bypass valve 42 permits the flow of oxygen to pass through the now open valve to prevent an excessive increase in pressure within the system.

The arrangement of FIG. 1 can be of an electric circuit configuration as shown in FIG. 3. The arrangement illustrated comprises a source of direct current 50, a manually operated starting switch 52 and a resistor 54 representing an igniter for the first oxygen generation element or candle 10 (see FIG. 2), all serially interconnected in the named order with the source 50 having a negative side connected to ground. Also the pressure switch 22 (see FIG. 2), a thermal switch 56 representing the temperature sensor 4 (see FIG. 1) for the first candle and a resistor 58 representing the igniter 6 for the second candle are serially interconnected across the source 50. The pressure switch 22 further is connected to a thermal switch 60 subsequently connected to a resistor 62. The thermal switch 60 acts as the thermal sensor 5 (see FIG. 1) for the second candle while the resistor 62 acts as the igniter 7 (see FIG 1) for the third candle and is connected to ground, that is, to the negative side of the source 50.

The thermal switches 56 and 60 in the example illustrated are adapted to be closed at a temperature of about 70° C. or more and disposed in contact with canisters of associated candles respectively.

It is to be noted that the candle to be last ignited, in this case, the third candle is not operatively coupled to a thermal switch.

The resistors 54, 58 and 62 are preferably formed of lengths of nichrome wire having a suitable diameter.

Prior to the start of the arrangement as shown in FIG. 3, the pressure switch 22 is in its closed position while all the remaining switches are in their open position. Then the starting switch 52 is manually closed to cause a current from the source 50 to flow through the now closed switch 52 and the resistor 54 to heat the resistor 54 until the first candle 10 (see FIG. 2) is ignited to generate oxygen while burning. The oxygen thus generated flows through the conduit 16 as shown at solid line in FIG. 2.

When the oxygen flowing through the conduit 16 reaches a flow rate in excess of the predetermined minimum magnitude thereof, the pressure switch 22 is immediately brought into its open position and maintained in the open position. On the other hand, the first candle continues to burn and generate oxygen. Thus a canister (not shown) for the first candle increases in temperature with a time delay relative to the opening of the pressure switch 22 until the thermal switch 56 in contact with the canister is closed. This closure of the thermal switch 56 does not lead to a flow of current through the resistor 58 because of the opening of the pressure switch 22.

The first candle is gradually consumed until the flow rate of oxygen flowing through the conduit 16 decreases to below the predetermined minimum magnitude. At that time, the pressure switch 22 is closed while the canister for the first candle is still hot to maintain the thermal switch 56 in its closed position. Thus a current from the source 50 flows through the now closed switches 22 and 56 and the resistor 58 to heat the resistor 58. Therefore the resistor 58 ignites the mating second candle resulting in the generation of oxygen from that candle. Thus the flow rate of the oxygen is again increased beyond the predetermined minimum magnitude to put and maintain the pressure switch 22 in its open position. Then the thermal switch 60 for the second candle is put and maintained in its closed position.

When the second candle approaches the end of the burn, the pressure switch 22 is closed to permit the third candle to be ignited in the same manner as above described.

In the process as above described, each candle burn to becomes hot enough to burn the associated resistor or the length of nichrome wire away. Accordingly current is no longer drawn through these opened portions of the circuit, thus preventing interference with ignition of the candles which are to be ignited in the latter stages.

From the comparison of FIG. 1 with FIG. 3 it will readily be understood that the series combination of the pressure switch 22 and the thermal switch 56 or 60 from the AND gate 2 or 3 as shown in FIG. 1, and that the closure of the pressure switch 22 is equivalent to the delivery of the first control signal $x$ from the gas flow sensor 1 to both AND gates 2 and 3 while the closure of the thermal switch 56 or 60 is equivalent to the delivery of the second control signal $y_1$ or $y_2$ from the temperature sensor 4 or 5 to the AND gate 2 or 3 respectively. Also the closure of both the pressure switch 22 and the thermal switch 56 or 60 corresponds to the output $z_1$ or $z_2$ from the AND gate 2 or 3.

It has been found that the use of the thermal switch having an operating temperature of 70° ± 5° C. gives a satisfactory result. That is, the present invention can attain the desired purposes with a thermal switch not so high in accuracy. While the thermal switch has been described to be disposed in contact with a canister for an associated candle, it is to be understood that the same may be disposed at any desired position as long as it can indirectly sense heat of combustion generated by an associated candle.

Further the temperature sensor or the thermal switch continues to deliver a signal after the flow sensor has terminated to deliver a signal because of the recovery of a flow rate of oxygen flowing through the conduit. The wall of the canister for each candle increase in temperature with a suitable time delay after the ignition of the candle and is reliably maintained at an elevated temperature not only during the burning of the candle but also for some time after the burning has been completed. Accordingly the thermal sensor is preferably disposed on the wall of the canister of the associated candle.

The present invention has several advantages. For example, the present invention is simple in construction and inexpensive because of the use of a flow sensor formed of a simple pressure switch and an orifice. On the other hand, gas flow sensors are generally complicated in mechanism and large in space occupied thereby. Particularly gas flow sensors for directly sensing the change in low speed gas stream having a low flow rate of at most about 0.3 liter per minute in the standard state signalling the end of burn are not readily nor inexpensively available. Also, in oxygen generation devices embodying the principles of the present invention, the user is required only to ignite a first oxygen generating element without the necessity of performing the subsequent operations. In addition, any person can use such an oxygen generation device without any anxiety because the sequential ignition system of the present invention is reliable.

While the present invention has been illustrated and described in conjunction with a single preferred embodiment thereof it is to be understood that numerous changes and modifications may be resorted to without departing from the spirit and scope of the present invention.

What we claim is:

1. A sequential ignition system for an oxygen generation device comprising a plurality of chemical oxygen generation elements each burning to generate oxygen, a common feed conduit connected to all said chemical oxygen generation elements to cause said oxygen from each of said oxygen generation elements to flow therethrough, gas flow sensor means connected to said feed conduit downstream of the most downstream oxygen generation element to provide a first control signal in response to a flow rate less than a predetermined minimum magnitude of said oxygen flowing through said feed conduit, manually operated igniter means for igniting a first one of said chemical oxgen generation elements, a plurality of igniter means for said chemical oxygen generation elements except the first one, a plurality of temperature sensor means operatively coupled to said chemical oxygen generation elements respectively except for the chemical oxygen generation element to be last ignited, each of said temperature sensor means being responsive to the burnt heated state of the associated chemical oxygen generation element to provide a second control signal, and an AND gate including one input connected to said gas flow sensor means, the other input connected to said temperature sensor means for each of said chemical oxygen generation elements, and an output connected to said igniter means for the next succeeding oxygen generation element, each of said AND gates responding to both said first and second control signals applied thereto to provide an output to actuate the associated igniter means to ignite the oxygen generation element operatively coupled thereto.

2. A sequential ignition system for an oxygen generation device as claimed in claim 1 wherein said gas flow sensor means includes an orifice connected in said feed conduit downstream of the most downstream oxygen generation element, and a pressure switch connected to said feed conduit downstream of the most downstream oxygen generation element, and said orifice is dimensioned to cause a backpressure sufficient to put and maintain said pressure switch in its open position at at least a predetermined minimum magnitude of a flow rate of said oxygen flowing through said feed conduit and to put and maintain said pressure switch in its closed position at a flow rate less than the predetermined minimum magnitude of said oxygen flowing through said feed conduit.

3. A sequential ignition system for an oxygen generation device as claimed in claim 1 wherein said temperature sensor means comprises a thermal switch.

4. A sequential ignition system for an oxygen generation device comprising a plurality of chemical oxygen generation elements each burning to generate oxygen, a common feed conduit connected to all said chemical oxygen generation elements to cause said oxygen from each of said oxygen generation elements to flow therethrough, a pressure switch connected to said feed conduit downstream of the most downstream oxygen generation element to be in its open position in response to a flow rate not less than a predetermined minimum magnitude of said oxygen flowing through said feed conduit and to be in its closed position in response to a flow rate less than the predetermined minimum magnitude of said oxygen flowing through said feed conduit, plurality of normally open thermal switches operatively coupled to said chemical oxygen generation elements respectively except for the oxygen generation element to be last ignited to be closed in response to the burning of the associated oxygen generation element, and an electric circuit including a source of direct current, a manually operated, normally open start switch and a resistor serially interconnected across said source, and said pressure switch and a different one of a plurality of series combinations of said thermal switch and a resistor being serially interconnected across said source, said resistors being operatively coupled to said oxygen generation elements respectively, said starting switch being first closed to cause the associated resistor to be heated with a current flowing therethrough from said source thereby to ignite the mating oxygen generation element, the closure of said pressure switch and said thermal switch serially interconnected similarly heating the associated resistor to ignite the mating oxygen generation element.

* * * * *